Patented Mar. 14, 1944

2,344,013

UNITED STATES PATENT OFFICE 2,344,013

HARDENING PHOTOGRAPHIC GELATIN

Charles F. H. Allen and Charles V. Wilson, Rochester, N. Y., assignors to Eastman Kodak Company, Rochester, N. Y., a corporation of New Jersey No Drawing. Application October 10, 1942, Serial No. 461,634

9 Claims. (Cl. 95—7)

This invention relates to photographic materials and more particularly to the hardening of gelatin, either when applied as an emulsion layer on photographic films, plates, or papers, or when applied in the form of a solution as a simple coating or sizing for paper or similar materials.

In the preparation of photographic emulsions, it has been the practice for many years to overcome the tendency of the gelatin to melt, or to swell during development, particularly at high temperatures, by addition of various so-called hardening agents, the most well-known of which appear to be chrome alum and formaldehyde. Other materials such as acrolein, glyoxal and saturated diketone compounds have been proposed for this purpose.

We have discovered a new class of hardening agents for photographic gelatin, namely, unsaturated aliphatic 1,4-diketone compounds, which are eminently suitable for the purpose. The compounds are effective in enabling gelatin emulsion layers and gelatin layers in general to resist swelling or melting, especially at relatively elevated temperatures.

It is an object of the present invention to provide a process of hardening albuminous substances such as gelatin by means of unsaturated aliphatic 1,4-diketone compounds.

Another object is to provide a process of hardening gelatin emulsions for photography.

Another object is to provide a process of hardening gelatin solutions or layers, in general, whether in the form of photographic emulsions or merely in the form of a separate layer or a coating on paper or other similar surfaces. Other objects will become apparent as our description proceeds.

In the present invention the above objects may be accomplished by incorporating into the gelatin emulsion or solution an unsaturated aliphatic 1,4-diketone compound, for example, diacyl ethylene such as diacetyl ethylene, dipropionyl ethylene, acetyl propionyl ethylene, etc.

In the following examples are set forth preferred embodiments of our invention, but they are included merely for purposes of illustration and not as a limitation thereof.

Example 1

To a portion of melted photographic emulsion containing 12 grams of gelatin is added 0.05 gram of diacetyl ethylene in 5 cc. of alcohol. The emulsion is coated on a film base and dried, then allowed to stand in storage for ten days. When the resulting emulsion is compared with a control coating of the same emulsion containing no hardening agent, both emulsions being processed at 85° F., it is found that the control emulsion softened in the developer, melted badly in the fixing bath, and mostly washed off of the support during washing. The emulsion hardened with diacetyl ethylene is found to remain firm through developing and fixing, and little softening is observed during washing.

A similar coating hardened with 0.1 gram of diacetyl ethylene in the same amount of emulsion gives an appreciably harder emulsion layer.

Example 2

A solution containing 12 grams of gelatin and a filter dye is treated with 0.1 gram of diacetyl ethylene in alcohol and cast as a filter layer over a sensitive emulsion layer. During processing of the emulsion layer the filter layer withstands the processing solutions without undue softening.

In a similar manner a gelatin filter is obtained by incorporating in a solution of gelatin an amount of the hardening agent, generally an amount of the order of 0.1 gram or more of the hardening agent per twelve grams of gelatin, sufficient to give the required degree of hardness, and the solution is coated on a suitable coating surface, for example, glass, paper, metal, etc., from which it is stripped after drying.

Diacetyl ethylene may be prepared by the method of Armstrong and Robinson, J. C. S. 1650 (1934). Homologues thereof may be prepared in a similar manner.

The above examples are, as indicated, merely illustrative and many changes may be made in the various manipulative procedures, temperatures, concentrations, and ingredients within the scope of our invention depending on the type of gelatin used, and the result desired in the finished product.

As indicated, our invention is applicable not only to the manufacture of photographic emulsions of satisfactory hardening properties, but may likewise be applied to the manufacture of gelatin solutions which are used for producing other types of coatings or layers on paper, cloth, film, and other surfaces. Also, the hardening agents of our invention may be used in conjunction with other gelatin hardening agents, for example, aldehydes, and alum.

What we claim is:

1. In the manufacture of photographic articles provided with a hardened gelatin layer, the step which comprises treating the gelatin with a diacyl ethylene.

2. In the manufacture of a photographic film provided with a gelatin silver halide emulsion layer, the step which comprises treating the gelatin with a diacyl ethylene.

3. In the manufacture of a photographic film provided with a gelatin silver halide emulsion layer the step which comprises treating the gelatin with diacetyl ethylene.

4. An article of manufacture comprising a sheet material having thereon a layer of the reaction product of gelatin and a diacyl ethylene.

5. A photographic material provided with a layer of silver halide dispersed in the reaction product of gelatin and a diacyl ethylene.

6. A photographic material provided with a layer of silver halide dispersed in the reaction product of gelatin and diacetyl ethylene.

7. A composition of matter comprising a solution of gelatin containing a diacyl ethylene, said solution being adapted for the production of a hardened gelatin layer.

8. A composition of matter comprising a solution of gelatin containing silver halide and a diacyl ethylene, said solution being adapted for the production of a hardened silver halide emulsion layer.

9. A composition of matter comprising a solution of gelatin containing silver halide and diacetyl ethylene, said solution being adapted for the production of a hardened silver halide emulsion layer.

CHARLES F. H. ALLEN.
CHARLES V. WILSON.